United States Patent [19]
Krula et al.

[11] Patent Number: 6,032,895
[45] Date of Patent: Mar. 7, 2000

[54] COLLARED HUB PIN FOR A TAPE CARTRIDGE

[75] Inventors: David A. Krula; Tom Kao; Li Zhao, all of San Diego, Calif.

[73] Assignee: Verbatim Corporation, San Diego, Calif.

[21] Appl. No.: 09/219,254

[22] Filed: Dec. 22, 1998

Related U.S. Application Data

[63] Continuation-in-part of application No. 09/135,017, Aug. 14, 1998.
[51] Int. Cl.[7] .................................................. G03B 23/02
[52] U.S. Cl. .................... 242/340; 242/352.4; 242/597.7
[58] Field of Search ................................ 242/345, 597.7, 242/340, 347.2, 352.4, 347, 597.6

[56] References Cited

U.S. PATENT DOCUMENTS

| | | |
|---|---|---|
| 2,216,463 | 10/1940 | Steiner . |
| 3,098,617 | 7/1963 | Day . |
| 4,172,569 | 10/1979 | Newell . |
| 4,262,860 | 4/1981 | Hurtig et al. . |
| 4,289,282 | 9/1981 | Kohno . |
| 4,447,019 | 5/1984 | Nagorski . |
| 4,502,648 | 3/1985 | Newell . |
| 4,523,727 | 6/1985 | Morioka . |
| 4,561,609 | 12/1985 | Collins et al. . |
| 4,562,497 | 12/1985 | Morinaga et al. . |
| 4,635,155 | 1/1987 | Georgens et al. ....................... 360/132 |
| 4,688,742 | 8/1987 | Hettich . |
| 4,695,011 | 9/1987 | Komatsubara et al. . |
| 4,747,556 | 5/1988 | Tanaka et al. . |
| 5,034,839 | 7/1991 | Okamura et al. ....................... 360/132 |
| 5,177,838 | 1/1993 | Rotter . |
| 5,362,009 | 11/1994 | Howard, Jr. et al. . |
| 5,416,659 | 5/1995 | Saitou et al. ............................ 360/132 |

FOREIGN PATENT DOCUMENTS

| | | | |
|---|---|---|---|
| 3004512 | 1/1978 | Japan .................................. 242/597.7 |
| 8196647 | 11/1983 | Japan .................................. 242/597.7 |

*Primary Examiner*—Donald P. Walsh
*Assistant Examiner*—William A. Rivera
*Attorney, Agent, or Firm*—Fenwick & West LLP

[57] ABSTRACT

A tape cartridge has a baseplate surrounded by a housing. Two hub pins are disposed within the housing substantially perpendicular to the baseplate. Each pin has top and bottom portions and a collared portion therebetween. The bottom portion of each pin is press-fitted into a mating aperture in the baseplate with the collared portion bearing against the baseplate. A large diameter tape hub is rotatably mounted on the top portion. The collared portions allow the hub pins to withstand heavy side loads without significantly deflecting from the perpendicular. Two large diameter tape hubs are rotatably mounted around the hub pins and improve the empty hub to full pack diameter ratios, and improve the resulting tangential drive force and tape tension profiles as the tape moves between the hubs. A back set of belt rollers includes a high-drag roller that engages the drive belt at a fixed wrap angle and produces a relatively constant drag. A front set of belt rollers includes a drive roller and has rollers mounted to form substantially equal geometries with rollers in the back set relative to the tape hubs. The constant wrap angle of a drive belt on the high-drag roller tends to outweigh varying drags from other rollers, causing less change in tape tension and tangential drive force as the tape is transferred from hub to hub in response to movement of the drive belt along a path in contact with the drive roller, the belt rollers, and the tape on the hubs.

15 Claims, 7 Drawing Sheets

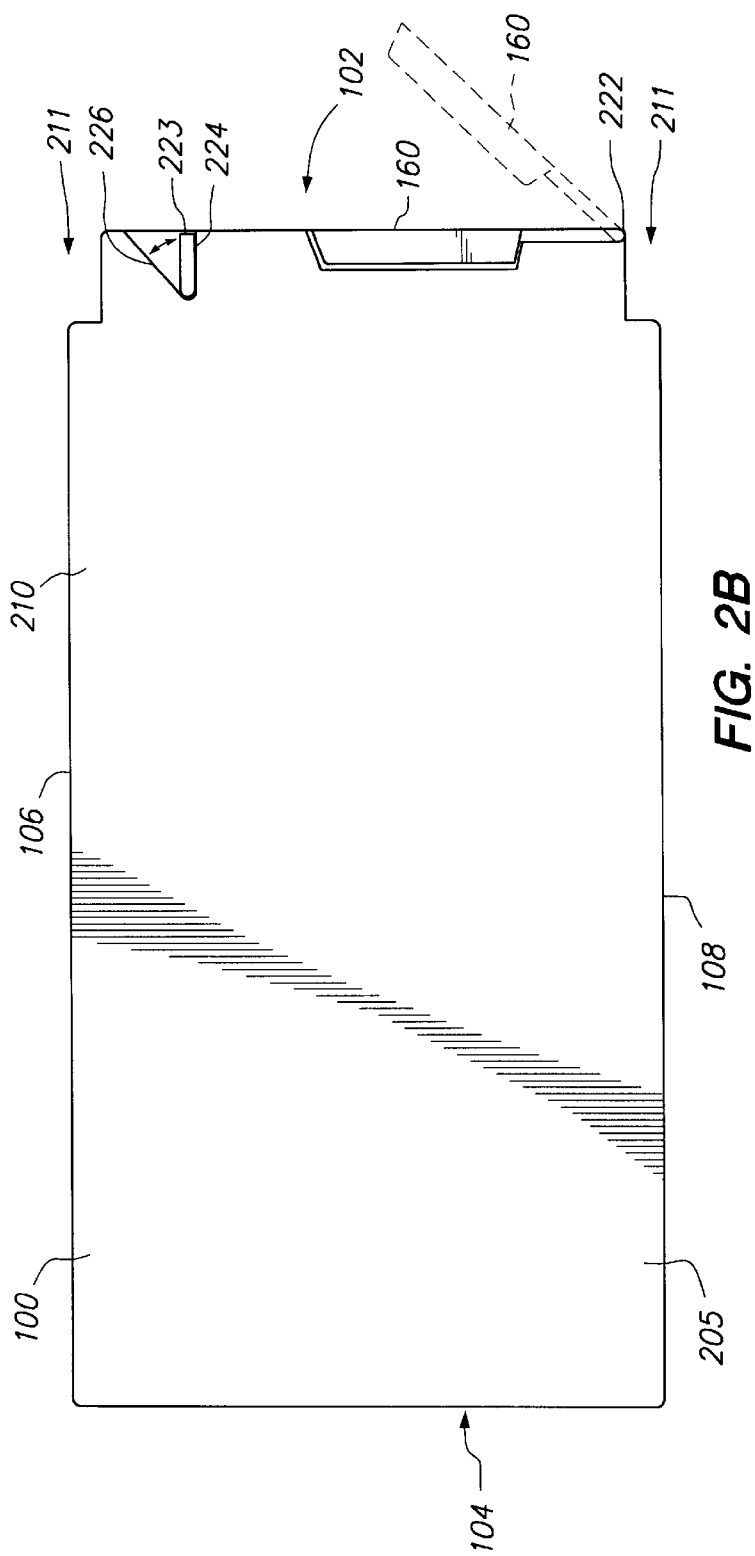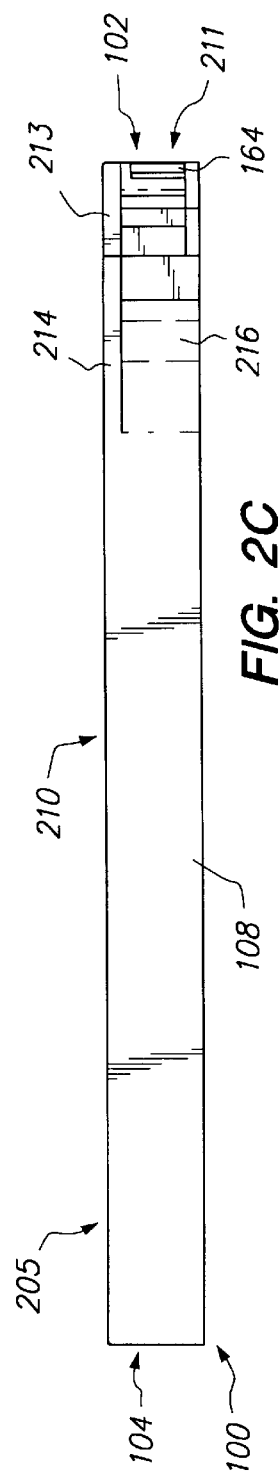

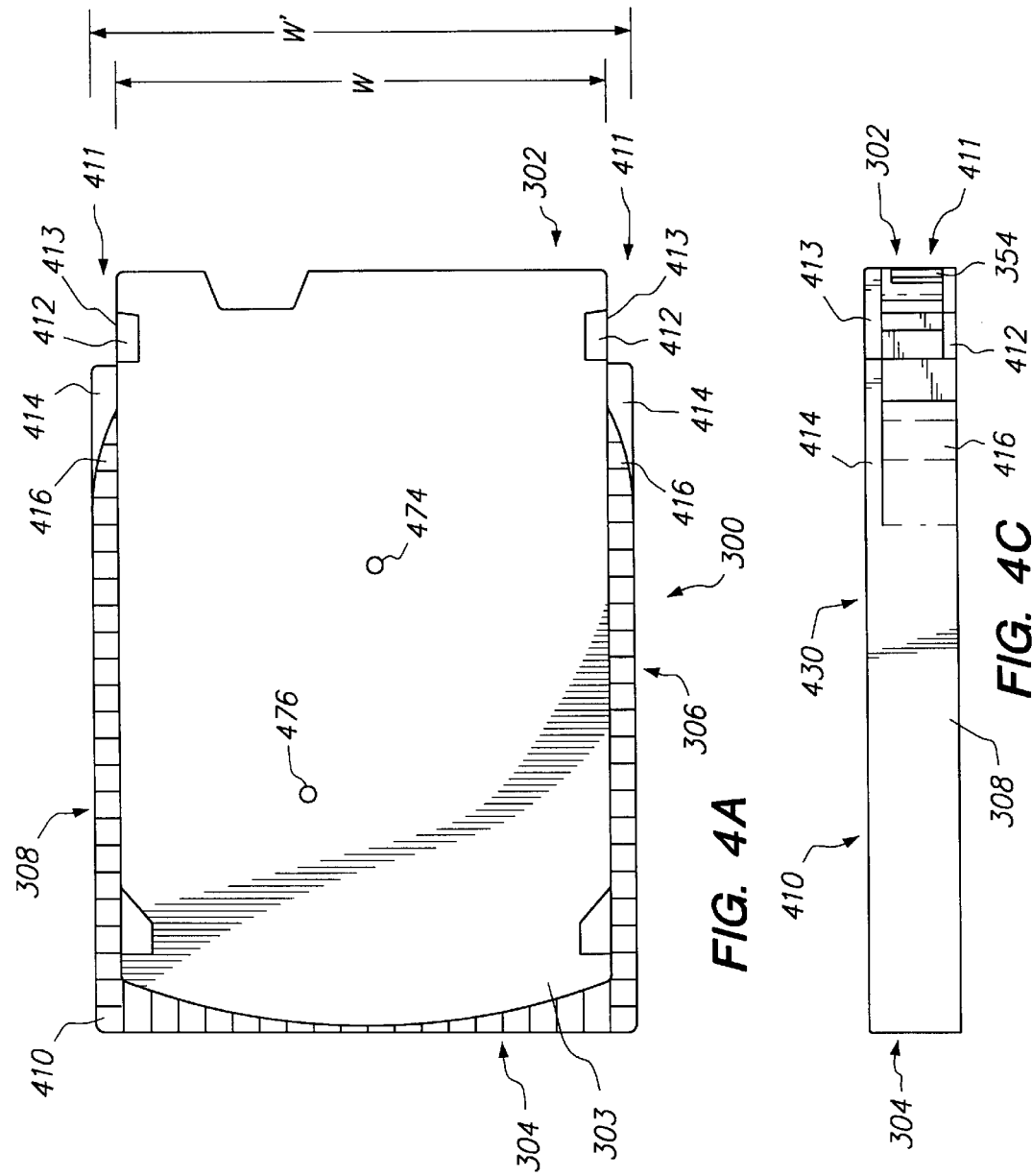

COLLARED HUB PIN FOR A TAPE CARTRIDGE

CROSS-REFERENCE TO RELATED APPLICATION

This application is a continuation-in-part of co-pending U.S. patent application Ser. No. 09/135,017, filed Aug. 14, 1998, which is hereby incorporated by reference herein.

BACKGROUND

1. Field of the Invention

This invention pertains in general to tape cartridges adapted for the magnetic recording of information and in particular to a tape cartridge having an improved hub pin for withstanding increased side loads and shocks.

2. Background of the Invention

For many years, magnetic recording tape has been utilized as an inexpensive and reliable medium for the storage and retrieval of data processing information. In the personal computer industry, it has become the practice to use tape cartridges to hold the tape and facilitate easy loading of the magnetic tape into a suitably adapted tape drive. Moreover, cartridges protect the magnetic recording tape from contamination and inadvertent contact during operation within the tape drive, as well as during storage outside of the tape drive. Wide acceptance of tape cartridges promoted adoption of standard configurations by the data processing industry.

As the data processing industry advances, there is a need for larger-capacity, belt-driven tape cartridges. Such larger tape cartridges may have a cartridge-drive interface compatible with commercially available industry standard tape drives. If the cartridge is not compatible with industry standard tape drives, the cartridge should have a mechanism to prevent the cartridge from being inserted into an incompatible tape drive.

One way to increase the capacity of a tape cartridge is to increase the length of tape stored therein. Since the volume within a tape cartridge is limited, some cartridge designs increase tape length by decreasing the thickness of the tape. Other designs increase available volume by extending the length of the cartridge while maintaining an industry standard cartridge-drive interface (see, for example, U.S. Pat. No. 4,262,860).

However, lengthening the tape exacerbates undesirable characteristics in the cartridge design. For example, tape tension is attributable to the difference in belt tensions applied to the two tape packs. This is a function of the diameters of the two packs and changes as tape moves from one pack to the other. A bow-tie tension profile of tape moving within a conventional belt-driven tape cartridge indicates the change in tape tension over the entire length of tape as it moves from hub to hub within the cartridge. The bow-tie profile is partly determined by the ratio of the diameter of an empty hub to the diameter of a full tape pack on a hub. Since a longer tape results in an increased tape pack diameter, a longer tape worsens the bow-tie profile of tape tension for a given design of tape cartridge.

Similarly, the tangential drive force ("TDF") is the amount of force needed to drive the tape within a cartridge in either direction. TDF is determined by the total drag of all components in the cartridge and is preferably constant regardless of the amount of tape on each pack. The drags produced by certain components, like the rollers guiding the drive belt, however, vary as a function of the tape pack diameter. As with the bow-tie tension profile, therefore, a longer tape results in a greater variation in TDF as the tape moves from pack to pack. These variations in the bow-tie tension and TDF profiles may detract from the performance of the tape cartridge.

In addition, the tape in the tape packs tends to vertically shift when the tape cartridge is subject to stress. To limit the extent of this shift, some tape cartridges have flanges attached to the top and bottom of each hub. However, these flanges cannot withstand high levels of stress and are not adequate for large tape packs.

Moreover, the additional tape adds considerable mass to the tape packs. The extra mass can cause the baseplate supporting the hub pin around which the tape pack rotates to break when the cartridge is subject to a strong shock, like when the tape cartridge impacts on the floor after being dropped. For example, the hub of an industry standard tape cartridge holding approximately 1000 feet of tape has a mass of approximately 31 grams. In contrast, a hub having 2400 feet of equivalent tape has a mass of almost 60 grams. Accordingly, the force applied to the hub pin and baseplate when the cartridge having 2400 feet of tape is dropped is almost twice the force applied to the hub pin and baseplate of a cartridge having only 1000 feet of tape. Thus, the baseplate of a cartridge having a relatively long length of tape may be damaged by shocks that the baseplate of a cartridge having less tape will withstand.

Industry standard tape cartridges, moreover, have a door pivotally mounted at the front of the cartridge to protect the tape media passing through an opening in the front face of the cartridge housing when the cartridge is outside of a tape drive. The door is typically biased closed when the cartridge is outside the drive, and cammed open by a rail in the tape drive when the cartridge is inserted therein. The door, however, does not cover a second opening in the front face through which the drive roller and portion of the tape are exposed, and which allows dust and other contaminates to contact the media.

Industry standard tape cartridges additionally have a write protect lock located near the front left corner of the cartridge. This lock is typically a sliding or rotating two-position switch and is often difficult to manipulate.

Accordingly, there is a need for an increased capacity cartridge having a mechanism for preventing insertion into a non-compatible drive and decreased variation in tape tension and TDF commonly associated with cartridges having increased tape length. In addition, the cartridge should have improved hubs to support the larger tape packs, a door that more efficiently protects the media from contamination, and a write protect lock that is easier to manipulate.

SUMMARY OF THE INVENTION

In accordance with the present invention, a tape cartridge preferably has a longer housing than industry standard tape cartridges. The cartridge housing has a planar front face having media and capstan access openings compatible with an industry standard tape drive. Preferably, the top and sides of the cartridge include transitional segments positioned rearwardly of the front face which extend laterally outward from the center to make the rear portion of the cartridge wider than the front portion. These transitional segments encounter components of a conventional tape drive that is equipped to receive conventional tape cartridges, and prevent the tape cartridge of the present invention from being fully inserted into such a non-compatible tape drive.

First and second tape hubs are rotatably mounted to the baseplate at respective first and second locations substantially perpendicular to the plane of the baseplate and slightly askew of a center line extending from the front face of the cartridge to the back of the cartridge. In order to reduce the variation in bow-tie and TDF tension profiles introduced by a long length of tape, the hubs preferably have a larger diameter than the diameter of hubs typically found in other industry-standard tape cartridges. Thus, the ratio of hub size (i.e. empty tape pack) to full tape pack size is reduced, contributing to decreased variations in the bow-tie tension profile. Moreover, each hub preferably has an integrally molded bottom flange and a ultrasonically welded top flange for preventing the tape packs from shifting. In a preferred embodiment, a spring is positioned between the hubs and the housing to bias the hubs toward the baseplate, thereby stabilizing the position of the hubs with respect to the baseplate.

In addition, each hub preferably includes a hub pin upon which the hub is rotatably supported. In order to withstand the increased side load applied to the hub pin and baseplate, for example, when the cartridge is dropped or otherwise subjected to a strong lateral force, the hub pin preferably includes a collared portion disposed to bear against the baseplate. The pin is preferably undercut just below the collar to ensure that the collar fully bears against the baseplate. The larger contact with the baseplate provided by the collared portion allows the pin and baseplate to withstand large side loads and therefore withstand strong forces without the pin substantially deflecting from the perpendicular orientation relative to the baseplate, even when a large mass of tape is wrapped around the hub.

First and second sets of rollers are rotatably mounted on the baseplate in the same plane as the tape hubs and serve to guide a drive belt through the cartridge. Each tape hub has an associated set of three rollers. Two rollers of each of the first and second roller sets are mounted substantially symmetrically with the respective first and second rotational axes of the tape hubs. This arrangement keeps the belt length almost constant regardless of tape pack size, resulting in an almost constant static installed belt tension and a more constant component drag over the full range of tape packs on each hub. A roller in the first set of rollers is the drive roller and has a flange that protrudes through the capstan access in the front face of the cartridge for engaging a capstan of a tape drive when the cartridge is inserted therein. The capstan imparts rotational movement to the drive roller and the associated drive belt which, in turn, rotates the tape packs and moves the tape from pack to pack within the cartridge.

The belt rollers preferably have a constant low level of rotational drag. However, several of the rollers engage segments of the drive belt that are also wrapped around a tape pack. Since the sizes of the tape packs vary as the tape moves through the cartridge, the wrap angles of the belt relative to the low-drag rollers vary. Therefore, the side loads exerted by the belt also vary depending upon tape pack size. Since side load affects the amount of drag produced by a roller, the combined drags of the relatively low-drag rollers vary as a function of tape pack size.

In accordance with one embodiment of the present invention, a high-drag roller associated with the second tape pack is positioned between two low-drag belt rollers and engages the drive belt at a constant wrap angle. Accordingly, the side load exerted by the belt on the high-drag roller is constant and, therefore, the drag produced by the roller is substantially constant. Since the varying drags introduced by the low-drag belt rollers are outweighed by the constant drag introduced by the high-drag roller, the cartridge tends to have a more constant bow-tie tension profile and resulting TDF.

A door is pivotally mounted near the front right corner of the tape cartridge and biased to cover the media and capstan access openings in the front face of the cartridge when the cartridge is outside of the tape drive. In addition, a write protect lock comprising a pivotally mounted arm is positioned near the left front corner of the tape cartridge to selectively engage a sensor switch within a compatible tape drive when the tape cartridge is fully inserted therein.

BRIEF DESCRIPTION OF THE DRAWINGS

FIGS. 2A, 2B, and 2C are, respectively, bottom, top, and side views of the tape cartridge embodiment of FIG. 1 including the housing;

FIGS. 4A, 4B, and 4C are, respectively, bottom, top, and side views of the tape cartridge embodiment of FIG. 3 including the housing.

DETAILED DESCRIPTION OF THE PREFERRED EMBODIMENTS

Figure 1:
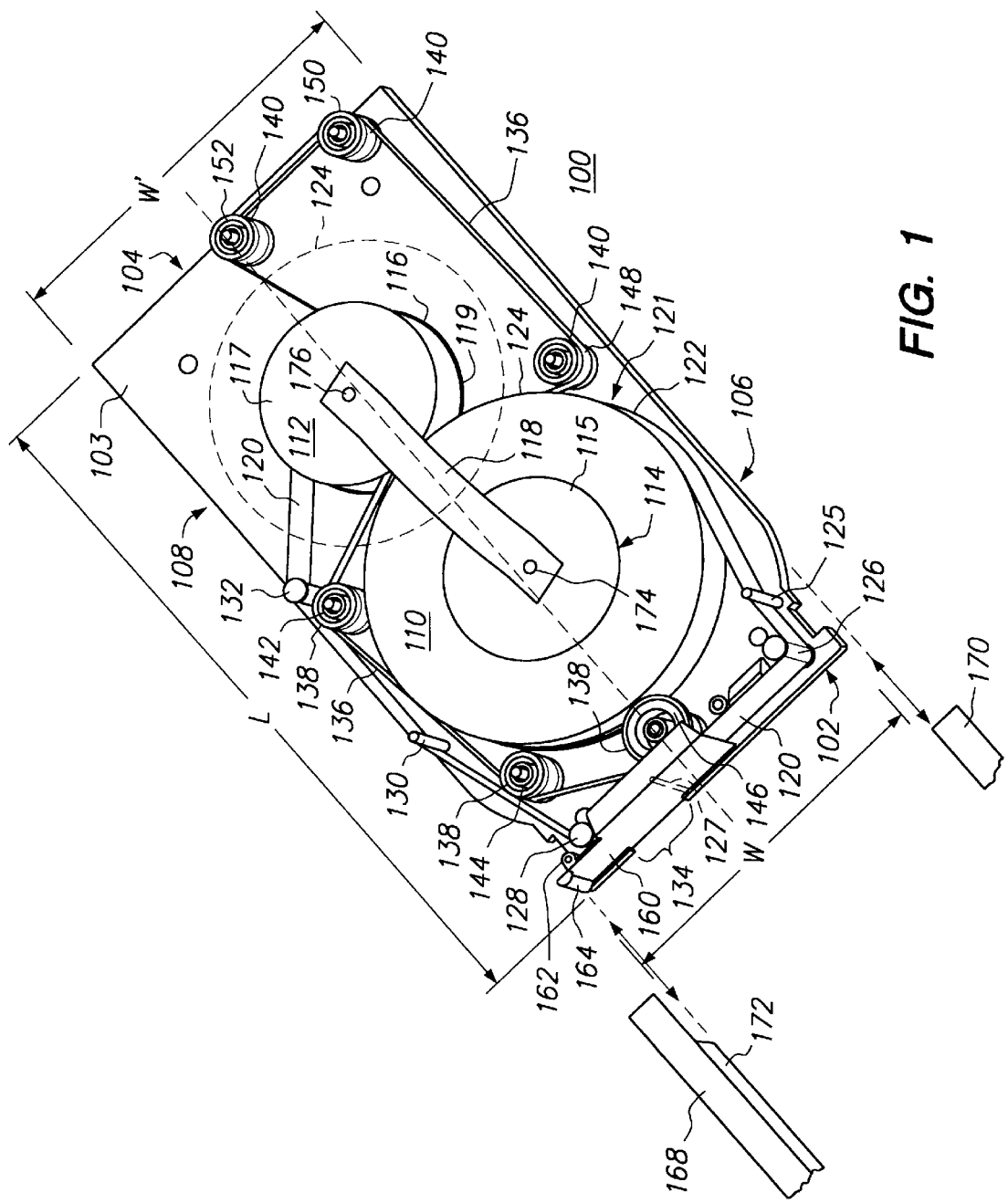
FIG. 1 is a perspective view of a tape cartridge of one embodiment illustrating the length and varying width of the baseplate and the components therein.

FIG. 1 is a perspective view of a tape cartridge 100 according to one embodiment of the present invention. As used herein with respect to the figures, terms like "width" or "wider" refer to the dimensions of the cartridge in the direction of arrows W and W', while "length" or "longer" refer to the dimensions in the direction of the arrows L. The "front" or "front face" of the cartridge is the side of the cartridge having the cartridge-drive interface, while the "back" of the cartridge is the side opposite the front. The "base" or "bottom" of the cartridge is the side which typically is the lower side of the cartridge when inserted into a drive, while the "top" is the side opposite the base or bottom. The "left" and "right" sides of the cartridge are as defined looking from the back toward the front of the cartridge with the top side up. It should be understood that use of these terms is for clarity only, and the cartridge may function in any orientation.

The tape cartridge 100 of FIG. 1 is surrounded by a substantially rigid cover or housing (not shown in FIG. 1) that is mounted on the baseplate 103 along with other components of the cartridge, as described later herein. The front 102 of the cartridge preferably has a width of about 3.18 inches and is dimensioned and has cartridge-drive interface openings in accordance with the American National Standards Institute (ANSI) specification X.3.249-1995 [Unrecorded Tape Mini-Cartridge For Information Interchange, 0.25 in (6.30 mm), 10,000–14,700 ftpi (394–579 ftpmm) coercivity 550 oersteds (44,000 amperes/meter)]. The back 104 and rear portion of the baseplate 103, in contrast, is preferably about 3.66 inches wide.

The left and right sides 106, 108 of the cartridge 100 extend from the front 102 to the back 104 and are preferably about 6.9 inches in length and are flush with and perpendicular to the front face 102. Beginning at a point preferably approximately 0.7 inches from the front face 102, the sides 106, 108 extend laterally for approximately 1.0 inches in a tapered or curved manner to a wider dimension W' over the remaining length to the rear portion of the back 104 of the cartridge 100. The cartridge measurements stated herein are approximate and may vary due to different configurations of the cartridge housing and baseplate 103 for compatibility with established industry standards. By having the back 104 of the cartridge 100 wider than the front 102, and by extending the length of the cartridge as illustrated in FIG. 1, additional volume is created within the housing for containing tape therein while maintaining an industry standard cartridge-drive interface at the front face 102.

Within the housing are front and back tape packs 110, 112, each comprising a rotatably mounted tape hub 114, 116 preferably located along and slightly askew opposite sides of a defined center line 118 extending lengthwise through the cartridge 100 and perpendicular to the front face 102. The front hub 114 is mounted slightly to the left of the center line 118 and the back hub 116 is mounted slightly to the right of the center line 118. Each hub has a preferred diameter of about 1.1 inches.

Figure 5A:
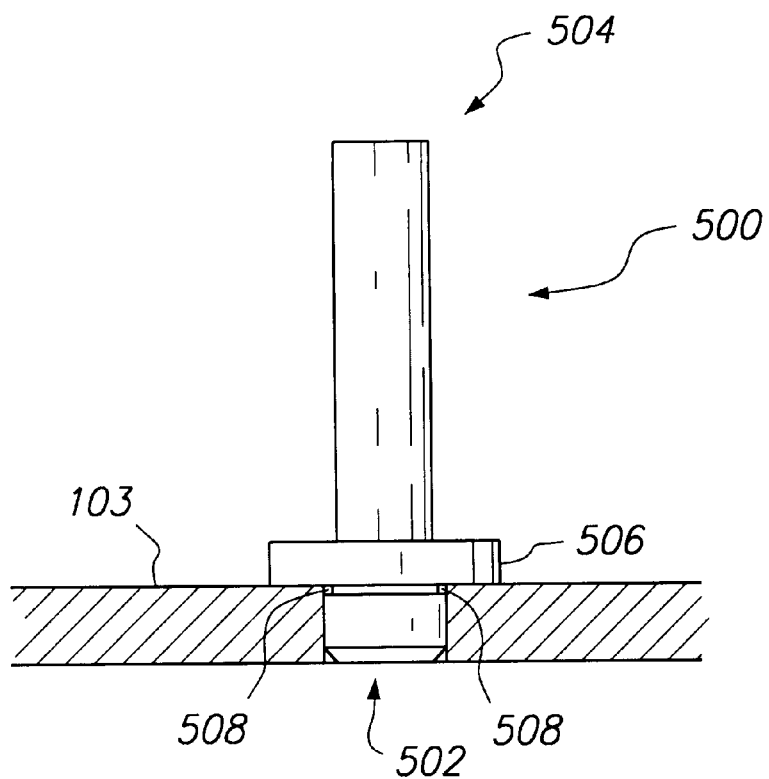
FIGS. 5A and 5B respectively illustrate cross-sectional and perspective views of a preferred embodiment of a hub pin according to the present invention.
Figure 5B:
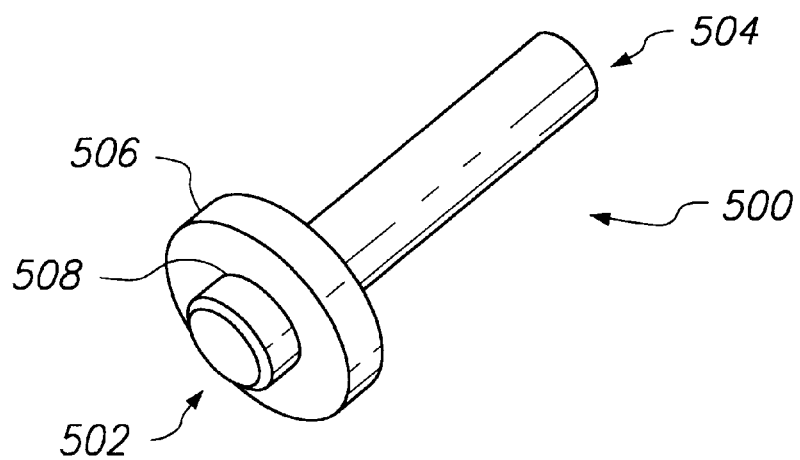

Each hub 114, 116 preferably includes a hub pin 174, 176 fixedly mounted to the baseplate 103 about which the hub is rotatably supported. FIGS. 5A and 5B respectively illustrate a cross-sectional and a perspective view of a preferred embodiment of the hub pin 500. The hub pin 500 is preferably machined from a single piece of stainless steel. The pin preferably measures 0.526 inches from bottom 502 to top 504 and has a generally cylindrical shape. The hub pin 500 preferably has an integral collar 506, also referred to as a shoulder, flange, or washer-like section, located approximately 0.076 inches above the bottom of the hub pin 500. Below the collar 506, the hub pin 500 preferably has a diameter of approximately 0.136 inches. Above the collar 506, the hub pin 500 preferably has a diameter of approximately 0.095 inches.

The collared portion 506 of the pin 500 preferably extends at a right angle from the long axis of the pin 500, has a diameter of approximately 0.236 inches, and is about 0.045 inches in axial thickness. Due to manufacturing tolerances, the peripheral junction of the bottom of the collar 506 with the cylindrical portion of the hub pin 500 is unlikely to form a perfect right angle. Accordingly, the bottom portion 502 of the hub pin 500 just below the collar 506 is undercut 508, or recessed, by approximately 0.001–0.006 inches relative to the diameter of the bottom 502 of the hub pin 500. This undercut portion 508 extends for approximately 0.010 inches as measured downwardly from the bottom of the collar 506.

When the pin 500 is mounted in the cartridge 100, the bottom portion 502 of the hub pin 500 preferably fits into a hole defined in the baseplate 103 with the bottom of the collar 506 bearing snugly against the top of the baseplate 103. The collar 506 holds the pin 500 substantially perpendicular to the baseplate 103. The undercut portion 508 of the pin 500 ensures that any manufacturing defect at the peripheral junction of the collar 506 with the cylindrical bottom portion 502 of the pin 500 does not prevent the bottom of the collar 506 from bearing snugly against the top of the baseplate 103.

When the cartridge 100 is subjected to stress, the side loads on the hub pins 174, 176 are partially transferred to the portions of the collars 506 in contact with the baseplate 103. Due to the strength of the collars 506, the pins 174, 176 and baseplate 103 are able to withstand significant side loads while the pins 500 remaining substantially perpendicular to the plane of the baseplate 103. In one embodiment of the tape cartridge 100 according to the present invention, the pins 174, 176 and baseplate 103 can withstand a side load of 100 lb., equivalent to a tape hub holding over 2400 feet of tape in a cartridge being dropped from greater than 3 feet onto a concrete floor, without significantly deflecting from perpendicular orientation relative to the baseplate.

Upper and lower flanges 115, 117, 119, 121 (lower flange 121 is hidden by the front tape pack 110) are preferably rigidly attached to each tape hub 114, 116 and are positioned to guide the tape 120 onto the respective hubs 114, 116. In one embodiment of the present invention, the lower flanges 119, 121 are integrally molded into the hubs 114, 116 and the upper flanges 115, 117 are ultrasonically welded to the hubs 114, 116. In another embodiment, the upper flanges 115, 117 are adhesively attached with a chemical bonding agent to the hubs 114, 116. Each flange has a preferred diameter of approximately 1.6 inches and prevents the tape 120 in the portions of the tape pack 110, 112 adjacent the flange from vertically shifting. In one embodiment of the tape cartridge of FIG. 1, the ends of a leaf spring 174 are biased against the hubs 114, 116 and the center of the leaf spring 174 is flexed upwards to contact the underside of the top of the cartridge housing (not shown). The bias of the spring 174 provides downward force on each hub 114, 116, which causes the hubs 114, 116 to contact the baseplate 103.

The magnetic recording tape 120 passes from the front pack 110, over sets of pins 125, 127 (hidden behind the media access door 160), 130 and guides 126, 128, 132 to the back pack 112. One embodiment of the present invention has approximately 2000 feet of 8 millimeter-wide magnetic recording tape holding approximately 25 gigabytes of data, although variations in the tape length and width may be used to produce embodiments holding different amounts of data. Pin 125 is positioned along the tape path from the front pack 110 to the back pack 112 to prevent the tape 120 from encountering the left side of the cartridge housing 106 when the front tape pack 110 is almost full. The tape also engages two guides 126, 128 which have upper and lower flanges for positioning the height of the tape 120 relative to the base plate 103 as the tape 120 passes through the access port 134 defined in the front 102 of the cartridge through which a read/write head of a tape drive can interface with the tape 120. The two guides 126, 128, in combination with another pin 127, define the plane of the tape 120 passing through the defined space of the access port 134 at a standardized height relative to the baseplate 103, and restrict the degree to which the read/write head may push the tape 120 out of the defined plane. Another pin 130 is positioned on the baseplate 103 to prevent the tape 120 from encountering the drive belt 136, and a third guide 132 with upper and lower flanges positions the height of the tape 120 relative to the baseplate 103 during tape movement to or from the back tape pack 112.

FIG. 1 illustrates the two conditions of the tape 120 when substantially fully wound about one of the hubs 114, 116. The figure illustrates the tape 120 by a solid line 122 when substantially all of the tape 120 is wound onto the front hub 114. Solid line 122 illustrates the front tape pack 110 at maximum diameter when the diameter of the back tape pack 112 is minimum at substantially the diameter of hub 116. When substantially all of the tape 120 is transported to the back hub 116, the diameter of the front tape pack 110 is minimum and the diameter of the back tape pack 112 is maximum, as illustrated by broken line 124. In a preferred embodiment of the present invention, the minimum diameter of a tape pack is approximately 1.1 inches, the maximum diameter of a tape pack is approximately 3.2 inches, and the half-pack diameter, i.e., when approximately the same amount of tape is on both the front and back tape packs 110, 112, is approximately 2.4 inches, although these latter two diameters vary as a function of tape length and tape thickness. Accordingly, the ratio of maximum pack diameter to minimum pack diameter is approximately 3:1.

An elastic endless drive belt 136 constructed, for example, of polyurethane drives the tape packs 110, 112 in the manner as described in the literature (see, for example, U.S. Pat. No. 3,692,255 entitled BELT DRIVEN TAPE CARTRIDGE, and issued on Sep. 19, 1972). The elasticity of the belt maintains the belt 136 in tension along a belt path in contact with a front set of rollers 142, 144, 146 and a back set of rollers 148, 150, 152 and the outer wraps of tape on the tape packs 110, 112. The front and back sets of rollers each comprise three rollers 142, 144, 146 and 148, 150, 152 that are each rotatably mounted on axles attached to the baseplate 103. Rollers 142, 144, 148, 150, and 152 have a preferred diameter of 0.43 inches. Thus, the diameters of the rollers are less than half the diameter of the hubs 114, 116.

The outer rollers 142, 146, 148, 152 within each of the front and back roller sets 138, 140 have substantially equal geometries with respect to the front and back tape hubs 114, 116. Thus, the distance and angle between rollers 142 and 146, roller 142 and hub 114, and roller 146 and hub 114, are substantially equal to the distance and angle between rollers 152 and 148, roller 152 and hub 116, and roller 148 and hub 116, respectively. By orienting the tape hubs 114, 116 and sets of rollers 138, 140 in this manner, the belt 136 length and associated elastic tension remains substantially constant regardless of tape pack size, resulting in a substantially constant static installed belt tension and associated substantially constant component drag. The length of the belt 136 when substantially all of the tape is on the front hub 114 is approximately 20.927 inches, when the tape is evenly distributed on the front 114 and back hubs 116 is approximately 21.075 inches, and when substantially all of the tape is on the back hub 116 is approximately 20.932 inches.

One factor of the tape tension equation is $$K \cdot \left( \frac{1}{P_1} - \frac{1}{P_2} \right),$$

where K is the coefficient involving the physical constants of the belt, and P1 and P2 are the diameters of the two tape packs. According to this equation, variations in tape tension result from the difference in the diameters of the tape packs and the characteristics of the belt. Since a greater diameter tape pack holds more tape around its circumference than a smaller diameter tape pack, the difference between minimum and maximum tape pack diameters is reduced by using a larger diameter hub. The hubs 114, 116 according to a preferred embodiment of the present invention have larger diameters than industry-standard hubs and, therefore, the difference between minimum and maximum tape pack 110, 112 diameters is reduced. Accordingly, the larger tape hubs 114, 116 and the substantially constant static installed belt tension result in a reduced variation in tape tension bow tie profile as the tape moves through the cartridge 100.

Roller 146 within the front set of rollers 138 also serves as the drive roller and includes an upper flange having a diameter of about 0.486 inches that is positioned to contact a capstan when the tape cartridge 100 is inserted into a compatible tape drive having an industry-standard interface. When so inserted, a read/write head enters the space of an access port 134 defined in the cartridge front 102 to make interface contact with the tape 120. At the same time, the flanged portion of the drive roller 146 contacts the capstan.

When the capstan rotates, the rotation is imparted to the drive roller 146 and to the drive belt 136 which is wrapped about a portion of the drive roller 146 below the flange having a narrowed diameter. The drive belt 136 engages the outer wraps of tape wound on the tape packs 110, 112 and causes the tape packs 110, 112 to rotate. Depending upon the direction of rotation of the drive roller 146, one tape pack serves as a supply pack and the other pack serves as the take-up pack.

A media access door 160 is preferably pivotally mounted about a pin 162 positioned adjacent to the right front corner of the cartridge 100 and preferably extends from the right front corner of the cartridge 100 to a point beyond the leftmost portion of the drive roller 146. The media access door 160 is biased closed by a spring wound around the pin 162. The closed media access door 160 covers a space defined in the front face 102 through which the flanged portion of the drive roller 146 protrudes, and the access port 134 defined in the cartridge front 102 through which the read/write head of the tape drive engages the tape 120. Accordingly, the closed media access door 160 covers and protects the exposed portions of the drive roller 146 and tape 120 from contamination while the cartridge 100 is outside a tape drive.

FIG. 1 illustrates a partial view of the left 170 and right 168 rails of a tape drive for accepting the cartridge 100 embodiment illustrated in FIG. 1. When the cartridge 100 is inserted into the tape drive, an extended portion 172 on the right rail 168 of the tape drive engages the end 164 of the media access door 160 on the opposite side of the pivot pin 162 from the main body of the door and pivots the door open about the pin 162, thereby allowing components of the tape drive to interface with the exposed components of the tape cartridge 100 when the tape cartridge is fully inserted in the tape drive.

A belt roller 142, 148 in each set of rollers 138, 140 is positioned between the tape hubs 114, 116 and is a "primary roller" positioned to shape the belt path away from the maximum diameter of the associated tape pack. An intermediate roller 144 of the front set of rollers 138 is preferably positioned adjacent to the front right corner of the tape cartridge 100 and the corresponding roller 150 of the back set of rollers 140 is preferably positioned adjacent to the back left corner of the tape cartridge 100.

Rollers 142, 144, 146, 148, and 152 preferably exhibit the lowest possible amount of rotational drag on the belt 136. In a perfect system, each of the rollers 142, 144, 146, 148, 152 would exhibit the same amount of drag, or no drag at all. In fact, each roller inevitably exhibits a slight difference in drag due to manufacturing tolerances. In one embodiment, the amount of drag exerted by rollers 142, 144, 146, 148, and 152 varies between approximately 0.01 and 0.11 oz/inches. In contrast, roller 150 preferably exhibits a relatively high amount of rotational drag relative to the other rollers 142, 144, 146, 148, 152 for reasons described below. In one embodiment, roller 150 exerts approximately 0.16 to 0.41 oz/inches of drag.

The drive belt 136 wraps about an arcuate portion of the front tape pack 110 from a point adjacent to roller 146 to a point adjacent to roller 148, and about an arcuate portion of the back tape pack 112 from a point adjacent to roller 152 to a point adjacent to roller 142. Depending upon the amount of tape 120 wound upon each of the tape packs 110, 112, the angles of wrap of the drive belt 136 on the tape packs 110, 112 relative to the rollers 142, 146, 148, 152 defining the ends of the arcuate portions vary as tape moves between the tape packs 110, 112. For example, if substantially all of the tape 120 is wrapped upon the front tape pack 110, the wrap angle of the belt 136 is approximately 154° about the front tape pack 110 and approximately 90° about the back tape pack 112. Furthermore, the wrap angle of the belt 136 is approximately 189° about the drive roller 146 and approximately 79° about roller 142. In addition, the wrap angle of the belt 136 is approximately 134° about roller 148 and approximately 128° about roller 152. As the tape 120 moves from the front tape pack 110 to the back tape pack 112, the wrap angles of the belt 136 about the tape packs 110, 112, rollers 146 and 148, and rollers 142 and 152 inversely vary until the wrap angles about each pair of corresponding hubs and rollers are reversed. Regardless of the sizes of the tape packs, the wrap angles of the belt 136 about roller 144 remains approximately 63° and the wrap angle of the belt 136 about roller 150 remains approximately 82°.

As the tape 120 moves through the cartridge 100 and the wrap angles vary, the side loads, or forces that the drive belt exerts upon the rollers 142, 146, 148 and 152, also vary. The side loads affect the bearing system of the rollers and cause the rotational drag of these rollers to increase as the side loads increase. Since total drag affects tape tension, the variations in drag can cause the tape tension to vary as the tape 120 moves through the cartridge 100.

These variations are pronounced in the outer rollers 148, 152 of the back set of rollers 140. If the two rollers 148, 152 had exactly equal rotational drag, the variations in drag caused by the inversely-varying wrap angles would cancel each other out. In practice, however, the changes in drag caused by the varying wrap angle can be substantial.

The wrap angle of the belt 136 relative to roller 150 of the back set of rollers, in contrast, 140 is relatively constant. Therefore, the side load from the belt 136 and drag provided by the roller 150 are also relatively constant. The drag exhibited by belt roller 150 is substantially constant and greater than the drag exhibited by each of the other belt rollers 142, 144, 146, 148, 152 in the cartridge 100. Accordingly, the large drag component produced by the belt roller 150 outweighs the smaller varying drag components introduced by the other belt rollers, and the total drag in the cartridge tends to be more constant over the length of tape moved between tape packs 110, 112. Thus, variations in the TDF and tape tension bow-tie profiles remain small as the tape 120 moves through the cartridge 100.

In alternative embodiments of the present invention, each of the roller sets 138, 140 may have fewer, or more, than three rollers. For example, certain configurations of the tape cartridge may not require rollers 148 and 152 to guide the belt 136 away from the tape packs 110, 112. Instead, they may be replaced by a floating roller, as described in U.S. Pat. No. 4,209,144, to provide additional drag. Similarly, it may be desirable to induce a total drag greater than the drag which can be produced using only a single roller 150. In such situations, the rotational drag imparted by other rollers, such as rollers 148 and 152, can also be increased in order to increase the total drag in the cartridge 100.

Figure 2A:
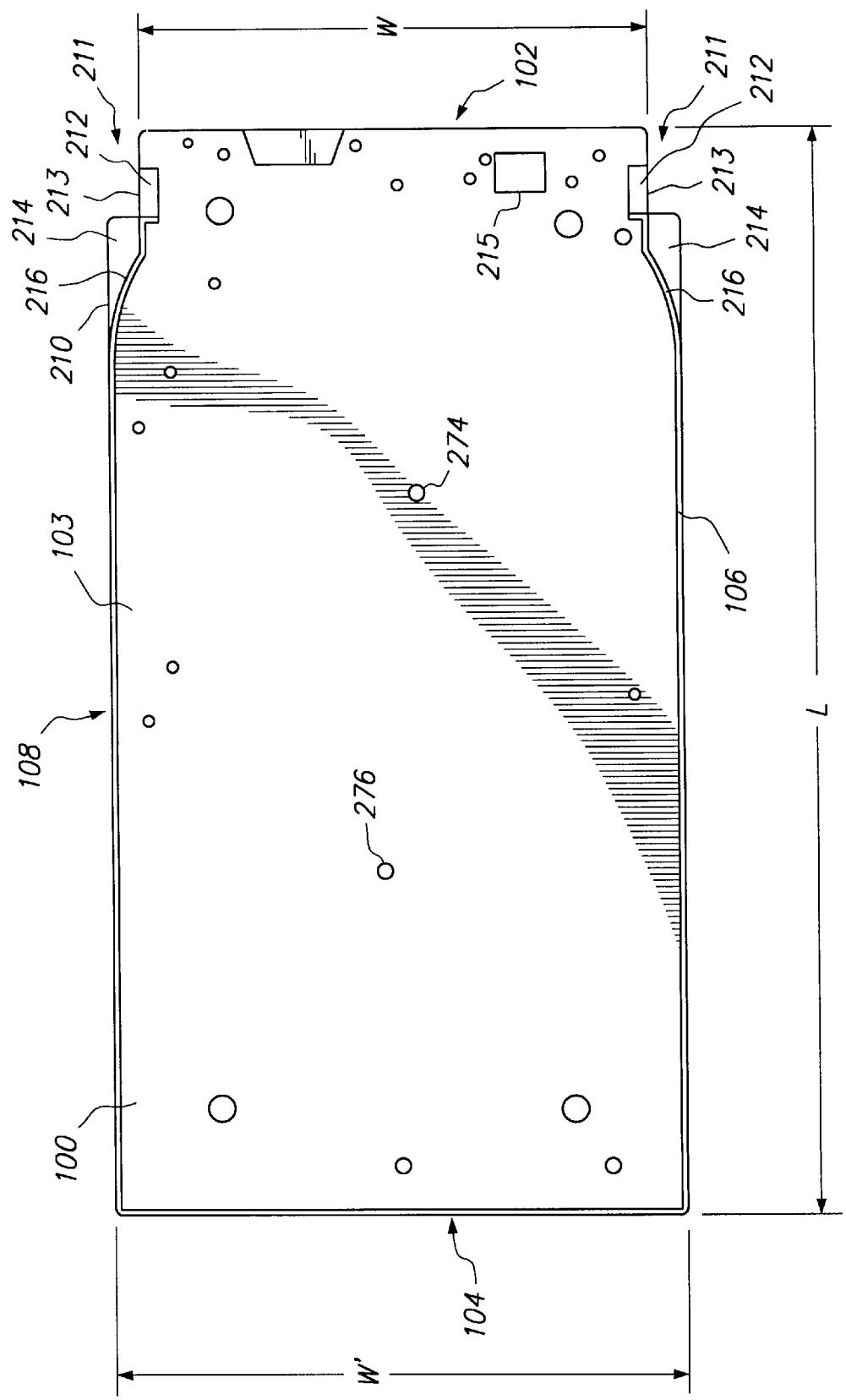

FIG. 2A illustrates a bottom view of the tape cartridge 100 embodiment illustrated in FIG. 1, and illustrates a "lockout" feature preventing the tape cartridge 100 from being fully inserted into an incompatible tape drive. The baseplate 103 forms the bottom of the cartridge 100 and the housing 210 forms the sides 102, 104, 106, 108 and top 205 (overhanging portions of which are visible in FIG. 2A) of the cartridge 100. The sides of the cartridge are substantially perpendicular to the plane of the baseplate 103 and, except near the front face 102 of the cartridge 100, the sides preferably extend only slightly beyond the baseplate 103. The housing 104 forming the top 205 of the cartridge is preferably parallel to the plane of the baseplate 103.

Near the front face 102 of the cartridge 100, the top 205 of the housing 210 extends to the same dimensions as the baseplate 103. The portions of the housing forming the sides 106, 108 of the cartridge 100 are relieved relative to the baseplate 103 and the top 205 of the housing, thereby defining a channel 211 on each side of the cartridge 100 for receiving a rail 168, 170 of the tape drive. The baseplate preferably 103 has a notch 212 on each side 106, 108 of the cartridge 100 positioned to encounter a locking device in the tape drive when the cartridge 100 is fully inserted therein. The top 205 of the housing does not have a corresponding notch 212 and therefore forms a shoulder portion 213 above the notch 212. At the back of the notch 212, the top 205 of the housing extends outward from each side 106, 108 of the cartridge 100 to form an additional overhanging shoulder portion 214, giving the top 205 of the housing the wider dimension W' relative to the width W of the front face 102. Also, rearwardly of the notch 212, the housing 210 forming the sides 106, 108 of the cartridge 100 becomes substantially flush with the baseplate 103, thereby eliminating the defined channels 211.

Beginning at a point preferably approximately 0.8 inches from the front face 102, the baseplate 103 and side portions 216 of the housing 210 extend laterally in a tapered or curved manner for approximately 0.6 inches to the wider dimension W'. As the baseplate 103 and side portions 216 extend laterally, the extents of the overhanging shoulder portions 214 are correspondingly diminished until the sides of the housing 210 are substantially flush with the top 205 of the housing and the baseplate 103. The mating apertures 274, 276 for accepting the hub pins 174, 176 are visible in the baseplate 103.

In industry-standard conventional tape cartridges, the channels defined in the sides of the cartridge typically extend for almost 2.0 inches beyond the front face. Accordingly, when the conventional cartridge is inserted into a tape drive accepting conventional compatible tape cartridges, the rails in the tape drive extend through the defined channels until the locking device in the tape drive engages the notches in the baseplate and, in combination with the rails, holds the cartridge in position.

When a tape cartridge 100 according to the embodiment illustrated in FIG. 2 is inserted into an incompatible tape drive, the rails 168, 170 in the tape drive encounter the tapered or curved portions 216 of the housing and prevent the cartridge 100 from being fully inserted into the tape drive, thereby also preventing the locking device from engaging the notches 212 in the baseplate 103, and preventing roller 146 from engaging the drive capstan, and precluding the read/write head from contacting the tape 120 through the access port 134. In addition, the overhanging shoulder portions 214 of the top 205 of the housing having the wider dimension W' may encounter a front face of the tape drive and prevent further insertion of the cartridge 100 therein. Accordingly, the cartridge housing serves as a "lockout" device by preventing the cartridge 100 from being inserted into a non-compatible tape drive that is designed to accept a different type of cartridge. Shoulders in the top edges of the cover interfere with the tabs in the front bezel of an industry standard drive. Additionally, stops in the side walls of the cover will prevent penetration of the rails of an industry standard drive into the cartridge sufficient to engage the drive roller. Aperture 215 in the baseplate 103 facilitates optical sensing therethrough of end portions of tape 120 in accordance with conventional industry standards.

FIG. 2B illustrates a top view of the tape cartridge 100 embodiment illustrated in FIG. 1 and illustrates the media access door 160 and write protect lock according to a preferred embodiment of the present invention. A partially open media access door 160 is shown in broken lines.

The write protect lock is preferably in a substantially triangular recessed portion 223 of the top 205 of the cartridge 100 positioned adjacent to the front left corner. The write protect lock preferably comprises an arm 224 pivotally mounted about a pivot pin 226 inserted into the top 205 of the cartridge and positioned adjacent to the back-most vertex of the recessed area 223. In one embodiment, indentations in the housing 104 restrain the arm 224 against either the left or right side of the recessed portion 223 of the housing, but allow the arm 224 to be moved with slight effort to the other side of the recessed portion. When the cartridge 100 is fully inserted into the tape drive, sensors within the tape drive sense the position of the arm 224 and determine whether to allow writing to the tape 120 in accordance with conventional standards.

FIG. 2C illustrates a side view of the right side 108 of the tape cartridge 100 embodiment illustrated in FIG. 1. FIG. 2C more clearly illustrates the channel 211 formed by the recessed side 208 of the housing 210. Also shown is the end 164 of the media access door 160 on the opposite side of the pivot pin 162 from the main body of the door which serves as a pivoted actuator for opening the door 160 as the tape cartridge is inserted into a compatible tape drive.

Figure 3:
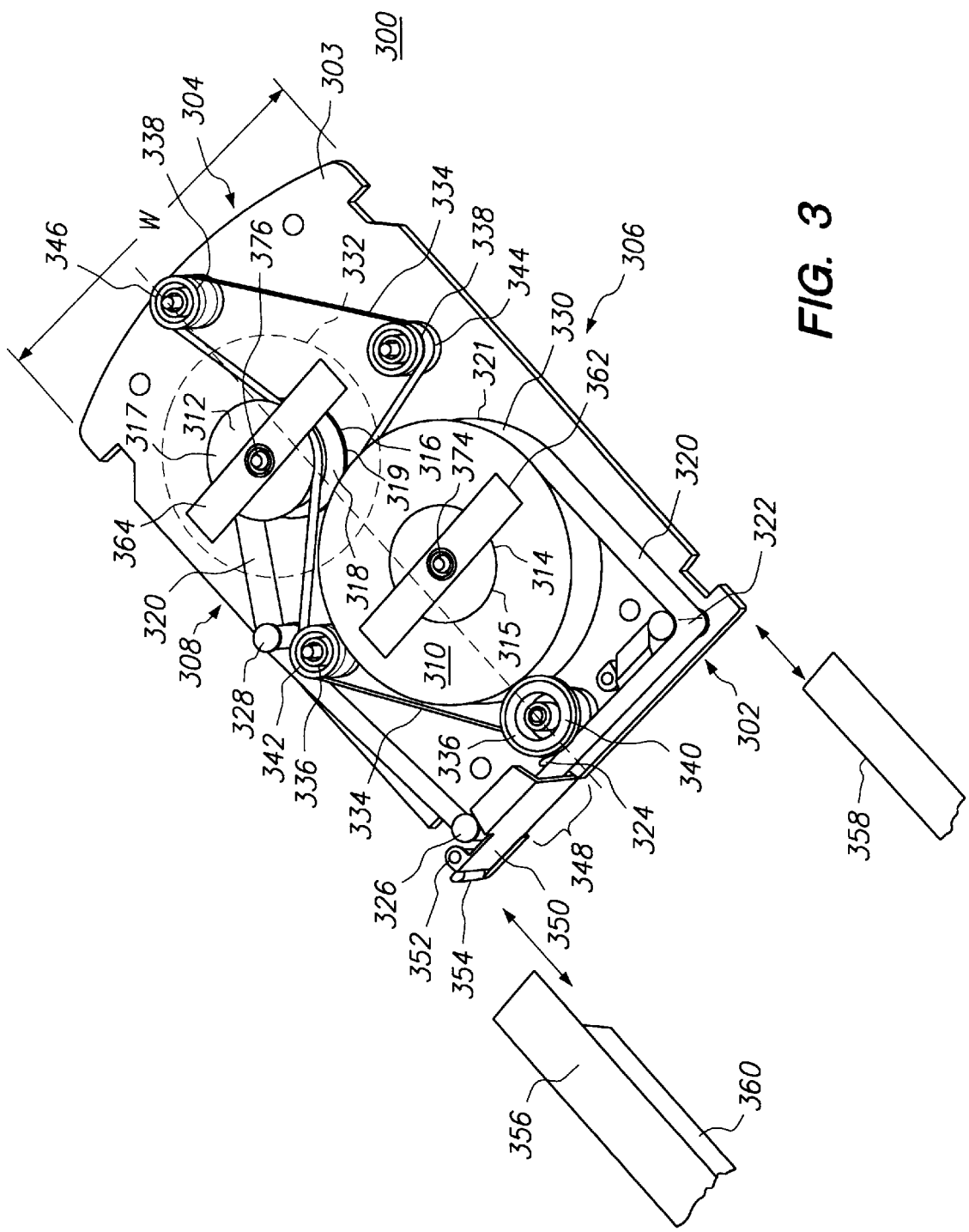
FIG. 3 is a perspective view of a tape cartridge of another embodiment illustrating the length and width of the baseplate and the components therein.

FIG. 3 is a perspective view of a tape cartridge 300 according to another embodiment of the present invention showing the baseplate 303 and associated components. The front 302 of the baseplate 303 preferably has an industry-standard width of 3.188 inches and the housing preferably has cartridge-drive interface openings in accordance with ANSI specification X.3.249-1995. The back of the baseplate 303 is arcuate and also has a width of about 3.188 inches. Accordingly, the sides of the baseplate 306, 308 are parallel to each other and perpendicular to and flush with the front 302 and back 304. The length of the baseplate 303 is preferably approximately 5.0 inches, as measured along the center line 318. Of course, other industry-standard dimensions may be used to configure a cartridge for operational engagement with a compatible tape drive.

The cartridge is assembled on the baseplate 303 to include within the housing front and back tape packs 310, 312, each comprising a hub 314, 316 preferably rotatably mounted on hub pins 374, 376 having collars 506 as illustrated in FIG. 5. The hubs 314, 316 are preferably located along and slightly askew a center line 318 extending lengthwise through the cartridge 300 and perpendicular to the front face 302. The front hub 314 is slightly to the left of the center line 318 and the back hub 316 is slightly to the right of the center line 318. The hubs 314, 316 preferably have diameters of about 0.6 inches. In addition, upper and lower flanges 315, 317, 319, 321 (flange 321 is hidden beneath the front tape pack 110) are preferably respectively ultrasonically welded to and integrally molded with the tops and bottoms of the hubs 314, 316 and are positioned to guide the tape 320 onto the hubs 314, 316. Alternatively, the upper flanges 315, 317 may be chemically bonded to the hubs 314, 316. Each flange has a preferred diameter of approximately 0.8 inches and prevents the tape 320 in the portions of the tape packs 310, 312 encountering the flanges from vertically shifting. In a preferred embodiment of the tape cartridge of FIG. 3, a spring 362, 364 is biased against the top flange 315, 317 of each hub 114, 116 and flexed upward at its ends to encounter the underside of the top of the cartridge housing (not shown). The biases of the springs 362, 367 provide downward force on each hub 314, 316, which keeps the hubs 314, 316 against the baseplate 303.

The magnetic recording tape 320 passes along a tape path from the front pack 310, over a set of guides 322, 326, 328 and a pin 324 to the back pack 312. A preferred embodiment of the present invention has approximately 1200 feet of 8 millimeter-wide tape. FIG. 3 illustrates two conditions of the tape 320 substantially fully wound about one of the hubs 314, 316. The figure illustrates the tape 320 by a solid line 330 when substantially all of the tape 320 is wound upon the front hub 314. As illustrated by solid line 330, the diameter of the front tape pack 310 is maximum and the diameter of the back tape pack 312 is minimum (at substantially the hub diameter) in that condition. When substantially all of the tape 320 is transported to the back tape pack 312, the diameter of the back tape pack 312 is maximum and the diameter of the front tape pack 310 is minimum (at substantially the hub diameter). This condition is illustrated by broken line 332. In a preferred embodiment of the present invention, the maximum diameter of a tape pack is approximately 2.1 inches, although this diameter may vary as a function of the hub diameter and tape length selected for assembly within the cartridge 300. Accordingly, the ratio of maximum pack diameter to minimum pack diameter is approximately 4:1.

The drive belt 334 drives the tape packs 310, 312 via movement along a path formed by front and back sets of belt rollers 336, 338 and the tape packs 310, 312. The drive belt 334 wraps about an arcuate portion of the front tape pack 310 from a point adjacent to roller 340 to a point adjacent to roller 344, and about an arcuate portion of the back tape pack 312 from a point adjacent to roller 346 to a point adjacent to roller 342.

Roller 340 within the front set of rollers 336 also serves as the drive roller and includes an upper flange having a diameter of about 0.486 inches that is positioned to contact a capstan when the tape cartridge 300 is inserted into a compatible tape drive. When so inserted, the media access door 350 pivoted on pin 352 is pivoted open via the lever arm 354 engaging a side surface 360 of a compatible tape drive, and a read/write head enters the space of access port 348 defined in the cartridge front 302 to make interface contact with the tape 320. At the same time, the flanged portion of the drive roller 340 contacts the capstan. When the capstan rotates, the rotation is imparted to the drive roller 340 and to the drive belt 334 which is wrapped about a portion of the drive roller 340 below the flange having a narrowed diameter. The drive belt 346 engages the outer wraps of tape wound on the tape packs 310, 312 and causes the tape packs 310, 312 to rotate. Depending upon the direction of rotation of the drive roller 340, one tape pack serves as a supply pack and the other pack serves as the take-up pack.

The media access door 350 is preferably pivotally mounted about a pin 352 positioned adjacent to the right front corner of the cartridge 300 and preferably extends from the left side of the access port 348 toward the right side of the front face 302 of the cartridge. The media access door 350 is biased closed by a spring that is wrapped around the pin 352. The closed media access door 350 covers and protects the portion of the tape 320 passing through the media access space 348.

FIG. 3 illustrates a partial view of the left 358 and right 356 rails of a tape drive for accepting a cartridge 300 according to the embodiment of FIG. 3. When the cartridge 300 is inserted into the tape drive, an extended portion 360 on the right rail 356 of the tape drive engages the end 354 of the media access door 350 on the opposite side of the pivot pin 350 from the main body of the door and pivots the door open about the pivot pin 350, thereby allowing access to the components of the tape cartridge 300 behind the door.

FIG. 4A illustrates a bottom view of the tape cartridge 300 embodiment illustrated in FIG. 3. The baseplate 303 forms the bottom of the cartridge 300 and the housing 410 forms the sides 302, 304, 306, 308 and top of the cartridge 300. The mating apertures 474, 476 for accepting the hub pins 374, 376 are visible in the baseplate 303. The sides of the cartridge are substantially perpendicular to the plane of the baseplate 303 and the top of the cartridge is substantially parallel to the plane of the baseplate 303.

Near the front face 302 of the cartridge 300, the housing 410 forming the top of the cartridge 300 extends to the same dimensions as the baseplate 303 and the portions of the housing forming the sides 306, 308 of the cartridge 300 are relieved relative to the baseplate 303 and the top of the housing 410, thereby defining a channel 411 on each side of the cartridge 300. The baseplate 303 has a notch 412 on each side 306, 308 of the cartridge 300 positioned to encounter a locking device in a compatible tape drive when the cartridge 300 is fully inserted therein. The top of the housing does not have a corresponding notch 412 and therefore forms a shoulder portion 413 above the notch 412. Rearwardly of the notch 412, the top of the housing extends outward from each side 306, 308 of the cartridge 300 to form additional overhanging shoulder portions 414 having a wider dimension W' relative to the width W of the front face 302 and the baseplate 303. Also rearwardly of the notch 312, the housing 410 forming the sides 306, 308 of the cartridge 300 becomes substantially flush with the baseplate 303, thereby eliminating the defined channels 411.

Beginning at a point preferably approximately 0.75 inches from the front face 302, the side portions 416 of the housing 410 extend laterally in a tapered or curved manner for approximately 0.6 inches to the wider dimension W'. As the side portions 416 extend laterally, the extent of the overhanging shoulder portions 414 beyond the side portions 416 is correspondingly diminished until the sides of the housing 410 extend to the same width W' as the top of the housing, which is approximately 0.25 inches beyond the baseplate 303. As shown in FIG. 4A, the housing 410 wraps around the baseplate 303. The back of the housing 304 is substantially parallel to the front face 302 and, since the back of the baseplate 303 is arcuate, the extension of the housing 410 beyond the baseplate 303 at the back of the cartridge 300 is correspondingly reduced in order to maintain this parallelism.

When a tape cartridge 300 according to the embodiment illustrated in FIG. 3 and having the housing illustrated in FIG. 4A is inserted into a tape drive that is adapted to receive a conventional prior art cartridge, the rails 356, 358 in the tape drive encounter the block 412 of the housing and prevent the cartridge 300 from being fully inserted therein. In some tape drive embodiments, the overhanging shoulder portions 414 of the housing encounter the front face of the tape drive and prevent the cartridge 300 from being inserted therein. Accordingly, the cartridge housing according to the present invention prevents the cartridge 300 from being inserted into a tape drive designed to accept a different type of cartridge.

Figure 4B:
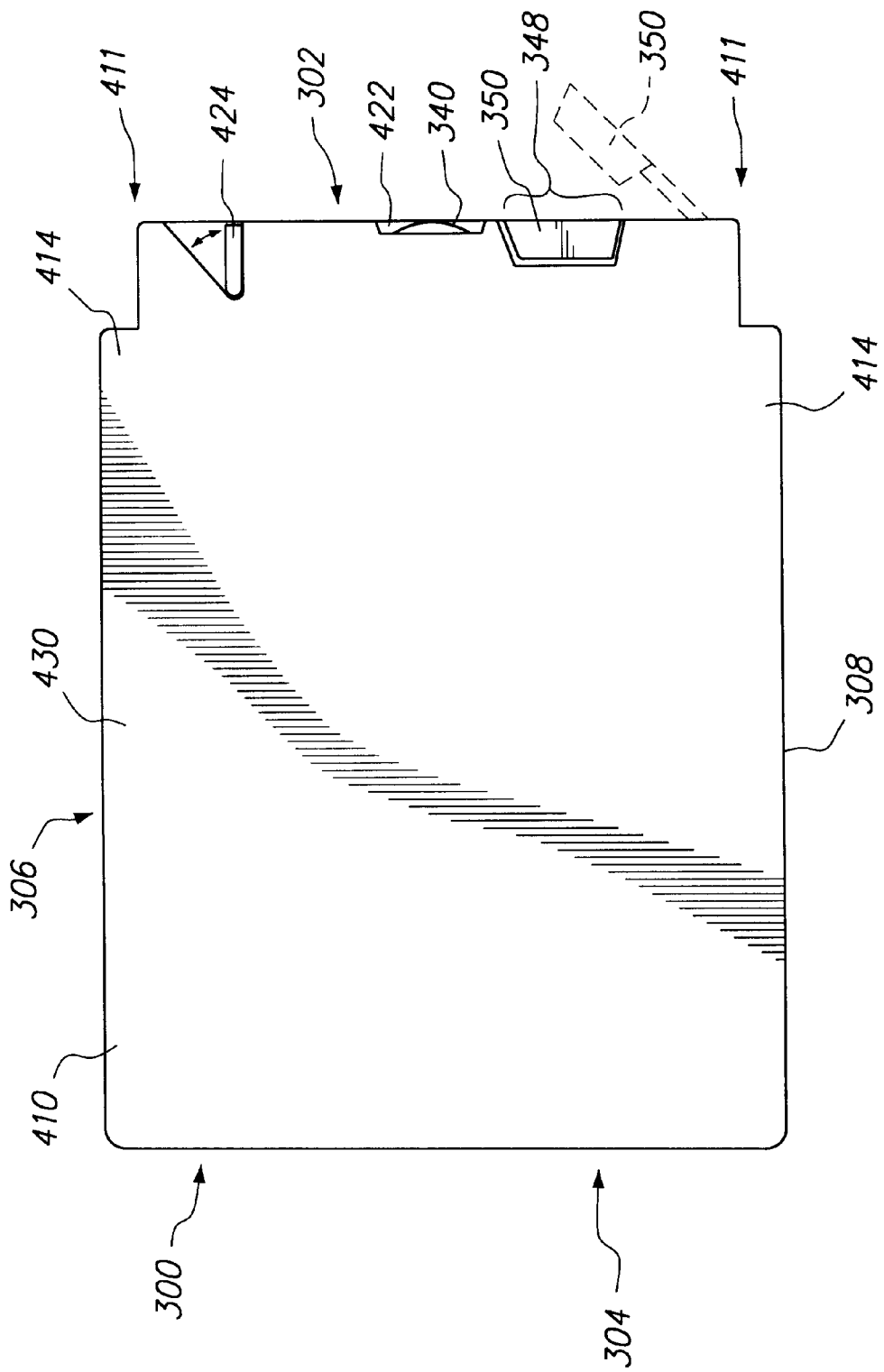

FIG. 4B illustrates a top view of the tape cartridge 300 embodiment illustrated in FIG. 3 and illustrates the top 430 of the housing, the media access door 350, and the write protect lock 424 according to a preferred embodiment of the present invention. A partially open media access door 350 is shown in dotted lines. Like in the embodiment illustrated in FIG. 2B, the write protect lock 424 is preferably in a substantially triangular recessed portion of the top of the cartridge 300 positioned adjacent to the front left corner for operation in the manner as previously described herein. In addition, a gap 422 defined in the top 430 and front 302 of the housing 410 exposes the flanged portion of the drive roller 340.

FIG. 4C illustrates a side view of the right side 308 of the tape cartridge 300 embodiment illustrated in FIG. 3. FIG. 4C more clearly illustrates the channel 411 formed in the side of the cartridge by the recessed side 308 of the housing 410, and the block 412 which prevents insertion into a standard drive. Also shown is the end 354 of the media access door 350 on the opposite side of the pivot pin 352 from the main body of the door which acts as a pivot arm for opening access door 350 in a manner as previously described herein.

Therefore, the improved tape cartridge according to the present invention allows use of a longer length of tape while minimizing undesirable effects, including increased variation in bow-tie tension and TDF profiles typically encountered when using a longer tape. The longer and wider cartridge housing allows more tape and larger hubs than possible in industry-standard tape cartridges. Also, flanges on the hubs prevent the tape pack from shifting. Moreover, selected rollers minimize variations in tape tension and drag over an entire length of tape that is attributable to changes in the diameters of the tape packs. In addition, the shorter-length channels defined in the sides of the cartridge prevent the cartridge from being inserted into a non-compatible tape drive, and the write protect lock allows easy changing of the write protect status.

We claim:

1. A tape cartridge for operation in a tape cartridge drive, the tape cartridge comprising:

a substantially rigid baseplate;

a housing coupled to the baseplate and having a front with a media access opening for interfacing with the tape cartridge drive;

first and second hub pins mounted perpendicularly on the baseplate, each hub pin comprising:
  a top portion:
  a bottom portion for mounting the hub pin on the baseplate;
  a collared portion intermediate to the top and bottom portions for contacting the baseplate to support the vertical mounting of the pin; and
  an undercut portion in the peripheral junction of the collared portion with the bottom portion having a diameter less than a diameter of the bottom portion;

first and second hubs rotatably mounted within the housing about the top portions of the first and second hub pins, respectively;

recording tape wrapped around the first and second hubs to form first and second tape packs and passing through the media access opening in the housing;

first and second roller sets rotatably mounted within the housing;

a drive roller within the first roller set and positioned at the front of the cartridge housing for interfacing with a capstan in the tape cartridge drive; and an endless drive belt wrapped over the first and second roller sets and the first and second tape packs for imparting rotation of the drive roller to the first and second tape hubs.

2. The tape cartridge of claim 1, wherein the top portion has a diameter of approximately 0.13 inches and the bottom portion has a diameter of approximately 0.09 inches.

3. The tape cartridge of claim 1, wherein the collar has a diameter greater than a diameter of the top portion.

4. The tape cartridge of claim 3, wherein the diameter of the collar is approximately 0.24 inches.

5. The tape cartridge of claim 1, wherein the collared portion of each hub pin includes a bottom surface in a plane that is disposed normal to a longitudinal axis of the hub pin for contacting the baseplate.

6. The tape cartridge of claim 1, wherein the undercut portion of each hub pin has a diameter approximately 0.001 to 0.006 inches less than the diameter of the bottom portion.

7. A hub pin for supporting a hub in a tape cartridge having a baseplate, the hub pin comprising:

a substantially cylindrical top portion having a first diameter for rotatably supporting a hub mounted thereon;

a substantially cylindrical bottom portion having a second diameter greater than the first diameter for mounting the hub pin within a mating aperture within the baseplate;

a collared portion disposed between the top portion and the bottom portion and having a third diameter greater than the second diameter for contacting the baseplate to support the hub pin substantially in perpendicular orientation relative to a plane of the baseplate; and an undercut portion having a fourth diameter less than the second diameter beneath the collar and disposed to ensure contact between the collared portion and the baseplate.

8. The hub pin of claim 7, wherein the first diameter is approximately 0.09 inches and the second diameter is approximately 0.13 inches.

9. The hub pin of claim 7, wherein the third diameter is approximately 0.24 inches.

10. The hub pin of claim 7, wherein the fourth diameter is approximately 0.001 to 0.006 inches less than the second diameter.

11. A method of manufacturing a hub pin for use in a tape cartridge having a baseplate, the method comprising the steps of:

forming a substantially cylindrical top portion for rotatably supporting hub mounted thereon;

forming a substantially cylindrical bottom portion for mounting the hub pin within a mating aperture in the baseplate;

integrally forming a collared portion intermediate to the top and bottom portions, for contacting the baseplate to support the hub pin in substantially perpendicular orientation relative to the baseplate; and forming an undercut portion relative to a diameter of the bottom portion in the peripheral junction of the collared portion with the bottom portion for ensuring contact between the collared portion and the baseplate.

12. The method of claim 11, wherein forming a substantially cylindrical top portion comprises:

forming a portion of the hub pin having a diameter of approximately 0.09 inches.

13. The method of claim 11, wherein forming a collared portion comprises:

forming a portion of the hub pin having a diameter of approximately 0.24 inches.

14. The method of claim 11, wherein forming a substantially cylindrical bottom portion comprises:

forming a portion of the hub pin having a diameter of approximately 0.14 inches.

15. The method of claim 11, wherein forming an undercut portion comprises:

forming a portion of the hub pin having a diameter of approximately 0.001 to 0.006 inches less than a diameter of the bottom portion.

* * * * *